Dec. 19, 1922.
1,439,665.
A. FORD.
MEANS FOR USE IN THE INFUSION OF TEA, COFFEE, AND THE LIKE.
FILED FEB. 16, 1922.
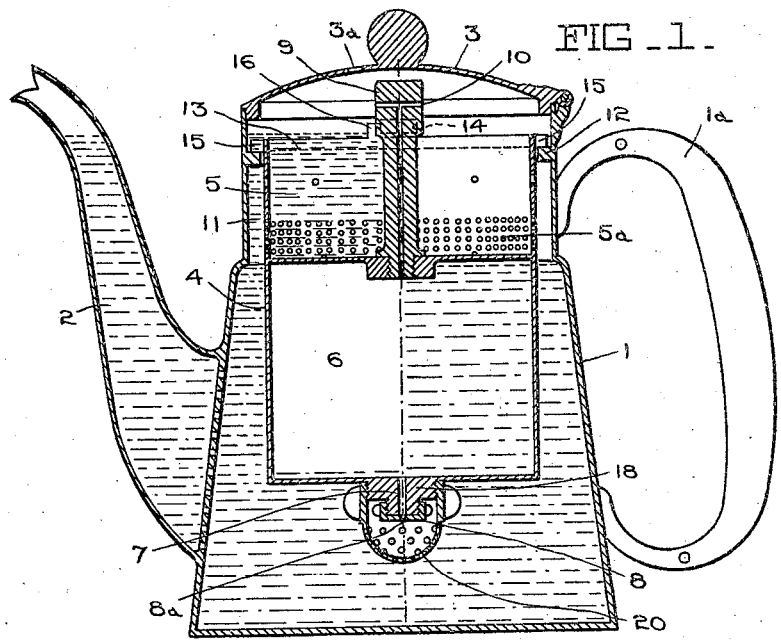
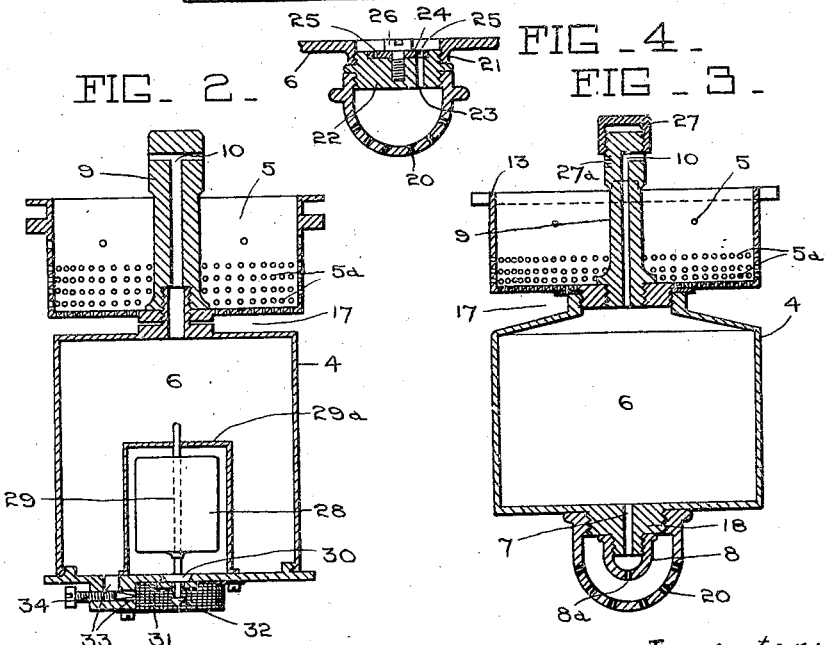
Inventor:
Albert Ford Patented Dec. 19, 1922.

1,439,665

UNITED STATES PATENT OFFICE.

ALBERT FORD, OF WELLINGTON, NEW ZEALAND.

MEANS FOR USE IN THE INFUSION OF TEA, COFFEE, AND THE LIKE.

Application filed February 16, 1922. Serial No. 537,057.

*To all whom it may concern:*

Be it known that I, ALBERT FORD, a citizen of the Dominion of New Zealand, and a subject of the King of Great Britain and Ireland, residing at 166 The Terrace, Wellington, in the Provincial District of Wellington, New Zealand, have invented certain new and useful Improvements in Means for Use in the Infusion of Tea, Coffee, and the like, of which the following is a specification.

This invention relates to vessels wherein tea, coffee or the like is infused.

The object of the invention is to provide means for use in such vessels, which will result in the infusions being more efficient than hitherto, and which will also prevent a predetermined period of infusion from being exceeded, the controlling of the period of infusion being specially desirable in the case of tea, in order to obtain the extraction therefrom of the theine or caffeine without extracting the detrimental tannin or tannic acid.

A further object of the invention is to lessen the possibility of stale or previously used tea leaves, coffee or the like being left in the vessel when infusing fresh tea, coffee or the like.

The invention consists in placing within a vessel in which tea, coffee or the like is infused, an inner vessel divided into a receptacle for receiving the tea, coffee or the like and a lower chamber open at its lower end to the interior of the outer vessel, and open to atmosphere at its upper end.

The aforesaid receptacle which is open at the top is perforated in order that liquid may pass from its interior into the outer vessel, without having to overflow from said receptacle which is not in direct communication with the chamber beneath.

The inner vessel is placed in the outer vessel so that the top of the former is slightly below the top of the latter, while the capacity of the chamber situated below the receptacle in which the tea, coffee or the like is placed is in excess of that of said receptacle and the annular space which surrounds same, together with the capacity of that portion of the spout (if one is used) level with the aforementioned receptacle.

The entrance of liquid from the outer vessel into the chamber in the lower portion of the inner vessel is controlled by the size of the opening or openings in the lower end of the inner vessel, or by the rate of escape of air displaced from said chamber.

The outer vessel is preferably provided with handles and with a cover, and means such as a spout or tap for drawing off its contents.

The invention will however be more particularly described with the aid of the accompanying drawing, wherein it is illustrated as applied to a pot used for infusing tea or coffee, and wherein:—

Figure 1 is a sectional elevation of the pot and

Figures 2 and 3 show by means of sectional elevations alternative forms of inner vessels for use therein, while Figure 4 is a sectional view of a valve for controlling the entrance of liquid to the lower chamber of the inner vessel.

In the illustrations the pot 1 which is provided with the usual spout 2, lid 3 containing a vent $3^a$, and handle $1^a$, is fitted with an inner vessel 4 containing an upper receptacle 5 in which the tea or coffee is placed and a lower chamber 6 open at its lower end to the lower portion of the pot 1 through an opening or port 7 and nipple 8, and open at its upper end to atmosphere through a stem 9 located centrally in the receptacle 5, the upper end of the vent 10 in said stem 9 extending to above the top of the receptacle 5.

The inner vessel 4 is preferably suspended in the pot 1 so that the receptacle 5 is located in the neck or upper portion of the pot 1 and is surrounded by an annular space 11. Any approved means can be employed to suspend the vessel 4 in the pot 1. Convenient means for the latter purpose comprise an internal ring 12 around the neck or upper portion of the pot 1, and an external ring 13 around the top of the vessel 4, the latter ring resting on the ring 12. The vessel 4 has such a depth that when placed in position in the pot it does not reach to the bottom of the latter.

In order to prevent the vessel 4 from being displaced when handling the pot 1, the ring 13 is made to engage beneath inward projections 14 from the pot neck, the ring 13 being provided with recesses 15 capable of being passed upon said projections 14 so as to permit the vessel 4 to be secured in position by turning same to bring the ring 13 beneath the projections 14.

Stops 16 on the last mentioned ring limit the turning movement of the inner vessel 4 by coming in contact with the projections 14.

The opening or port 7 in the bottom of the chamber 6 is made preferably through a boss 18 on to which is screwed the nipple 8 containing a hole 8$^a$ of the required diameter according to the rate at which it is desired liquid shall pass from the lower portion of the pot 1 into the chamber 6.

A strainer 20 is preferably but not necessarily placed over the nipple 8 as a precaution against the latter becoming blocked by sediment finding its way into the lower portion of the pot.

An adjustable valve can be provided for the purpose of regulating the passage of liquid into the chamber 6 as desired. This valve (Figure 4) is fitted in a boss 21 at the bottom of said chamber and comprises a plug 22 which screws into said boss and contains a single hole 23. A plate 24 containing a series of holes 25 of different diameters is secured on the plug 22 by a single central screw 26, and by loosening the latter, the plate 24 can be rotated until the hole required is brought over the hole 23, whereupon the plate 24 is locked to the plug 22 by tightening the screw 26.

By these means the inlet passage opening through the lower end of the chamber 6 can be enlarged and reduced as desired within the range of the series of holes 25 contained in the plate 24.

Further means for controlling the rate of entrance of liquid into the chamber 6 consists in regulating the escape of air displaced therefrom by the liquid. This can be done by providing a valve 27 on the stem 9 (Figure 3) capable of being adjusted over the upper end of the vent 10 so that the latter can be opened and closed to bring about the desired rate of entrance of the liquid.

Markings 27$^a$ can be provided on the stem 9 whereby the valve 27 may be set in order to obtain a desired rate of inflow of liquid.

The vessel 4 can be a cylinder or container closed at the bottom and divided by a diaphragm into the receptacle 5 and chamber 6 as shown in Figure 1, or it can consist of two separate portions screwed or otherwise detachably secured together as shown in Figures 2 and 3.

When the inner vessel is formed as in Figure 1, the wall of the receptacle 5 is perforated or provided with openings 5$^a$, but when said receptacle 5 and chamber 6 are secured together as shown in Figures 2 and 3, or when a space 17 is left between them, then holes 5$^a$ are preferably provided in the bottom as well as in the wall of the receptacle 5.

In use the requisite quantity of tea or coffee, is placed in the receptacle 5 and boiling water poured thereon, the water passing through the tea or coffee and perforations or holes 5$^a$ into the body of the pot 1. Water is poured in until the pot 1 is filled level with the top of the receptacle 5.

Liquid enters and rises in the chamber 6 until the liquid level therein equalizes the liquid level in the body of the pot 1, the latter level during such equalization having fallen below the bottom of the receptacle 5 owing to a volume of liquid equal to the volume of water in the receptacle 5 and in the annular space 11 and upper portion of this spout 2, neck or top of the pot 1 having entered the chamber 6 after the pouring of water into the pot has ceased, the air displaced from said chamber 6 escaping by way of the vent 10 in the stem 9 and the vent 3$^a$ in the lid 3, the latter having been replaced.

The period of infusion can be increased or shortened as desired by regulating the rate of entrance of liquid into the chamber 6 or by enlarging or reducing the diameter of the passage into the lower end of the latter or by regulating the escape of air through the vent 10. Thus by allowing liquid to enter said chamber 6 slowly, the fall of the water level in the receptacle 5 must therefore be correspondingly slow and the tea or coffee be subjected to infusion for a period which is longer than when water is allowed to enter said chamber quickly.

Means can also be provided whereby the water level in the receptacle 5 can be caused to fall quicker towards the end of the infusing period, than during the earlier part thereof.

This is accomplished by providing a float 28 (Figure 2) within the chamber 6 said float 28 having a stem 29 working in a guide 29$^a$ and carrying a valve 30 which normally closes an opening 31 in the bottom of said chamber 6. The stem 29 also projects through the chamber bottom and is fitted with a stop 32 at its lower end.

A second opening 33 in the chamber bottom is controlled by a valve 34, which is set to permit liquid to enter the chamber 6 at the desired rate. On a predetermined volume of liquid entering the chamber 6 the float 28 is lifted and causes the valve 30 on the stem 29 to uncover the opening 31 in the chamber bottom whereupon liquid is allowed to enter the chamber 6 more quickly and causes the water level in the receptacle 5 to fall at the same rate, until the levels in the chamber 6 and the pot 1 become equal and are both below the receptacle 5.

By providing a chamber 6 for the purpose of receiving a volume of liquid in excess of that which the receptacle 5, the space 11 and upper portion of the spout will hold the tea or coffee, is subjected to infusion for a period equal to the time it takes a volume of liquid equal to the volume of water mentioned, to enter the chamber 6, and this can be regulated as desired, by increasing or decreasing the size of the liquid entrance through the chamber bottom, or by regulating the escape of the air displaced from said chamber.

On liquid in the pot 1 being poured out or drawn off, liquid in the chamber 6 passes from the latter into the pot and equalizes the levels.

The receptacle 5 for the tea or coffee being at the top of the pot 1, where the water remains the hottest, the infusion is rendered more efficient than when said tea is placed in the bottom of the pot where the water is coolest.

Also the position of the receptacle is such that with ordinary care it is hardly possible for used tea leaves or coffee to be inadvertently left in the pot and further said used tea leaves or coffee owing to the water having receded from same and the ascending heat, are enabled to be removed in a semidry state.

For the purpose of clearly illustrating the variation in the water and liquid levels which occur during the period of infusion, the left hand portion of Figure 1 of the drawing has been made to show first the level of the water just after the requisite quantity thereof has been poured into the pot, while the right hand portion of the same figure shows the equalization of the levels in the pot 1 and chamber 6, by the entrance into the latter of a volume of liquid equal to a volume of water, which would fill the receptacle 5, the annular space 11 and the portion of the spout 2 above the bottom of the receptacle 5.

What I do claim and desire to obtain by Letters Patent of the United States of America is:

1. Means for the purpose set forth comprising an outer vessel, and a vessel therein containing a chamber located below the top of the outer vessel, said chamber being open to atmosphere and the outer vessel and having a liquid holding capacity at least equal to the liquid holding capacity of the apparatus above said chamber; and means above the latter for holding the commodity to be infused.

2. Means for the purpose set forth, comprising an outer vessel; and a vessel provided with a perforated receptacle for the commodity to be infused and a chamber open to atmosphere and the outer vessel, placed in the latter, so that said chamber is below the top of the outer vessel.

3. Means for the purpose set forth, comprising an outer vessel, a vessel in the latter provided with a perforated receptacle for the commodity to be infused and containing a chamber located below the top of the outer vessel, said chamber being open to atmosphere through a stem in said receptacle and open through its lower end to the outer vessel.

4. Means for the purpose set forth, comprising an outer vessel; a vessel provided with a perforated receptacle and with a chamber below the latter open to atmosphere and the outer vessel, placed in the latter so that said receptacle is slightly below the top of the outer vessel and so that a space is left between the upper portion of the latter and the receptacle.

5. Means for the purpose set forth comprising an outer vessel; a perforated receptacle supported therein and below the top thereof so as to leave an annular space between the upper portion of the outer vessel and said receptacle; a chamber below the latter; having a port opening into its lower end; means for altering the rate of the passage of liquid through said port; a strainer at the bottom of said chamber; and a stem in said receptacle containing a vent which extends from said chamber to above the receptacle.

6. Means for the purpose set forth comprising an outer vessel; a perforated receptacle supported therein and below the top thereof so as to leave an annular space between the upper portion of the outer vessel and said receptacle; a chamber below the latter having a port opening into its lower end; a nipple open to said port; a strainer over said nipple; a stem in said receptacle containing a vent which extends from said chamber to above the receptacle and a valve for opening and closing the upper end of said vent.

7. In means for the purpose set forth, an inner vessel having an external ring with recesses therein, secured around its upper end and an outer vessel having an internal ring around its upper portion; inward projections from the outer vessel above the ring thereon, and upward projections from the ring on the inner vessel.

8. In means for the purpose set forth, an inner vessel containing a chamber adapted to receive liquid from an outer vessel; a port through which the liquid passes from the outer vessel into said chamber, and a valve actuated by a float in said chamber to permit an increase in the rate of passage of water into the latter to occur.

In testimony whereof I have signed my name to this specification in the presence of two witnesses.

ALBERT FORD.

Witnesses:
ERNEST WILFRED BOYCE CAREY,
PERCIVAL STAFFORD BYRNE.